Oct. 11, 1932.   M. H. CARPENTER ET AL   1,882,484
INDEPENDENTLY SPRUNG WHEEL CONSTRUCTION FOR THE FRONT END OF MOTOR VEHICLES
Filed April 6, 1929   2 Sheets-Sheet 1
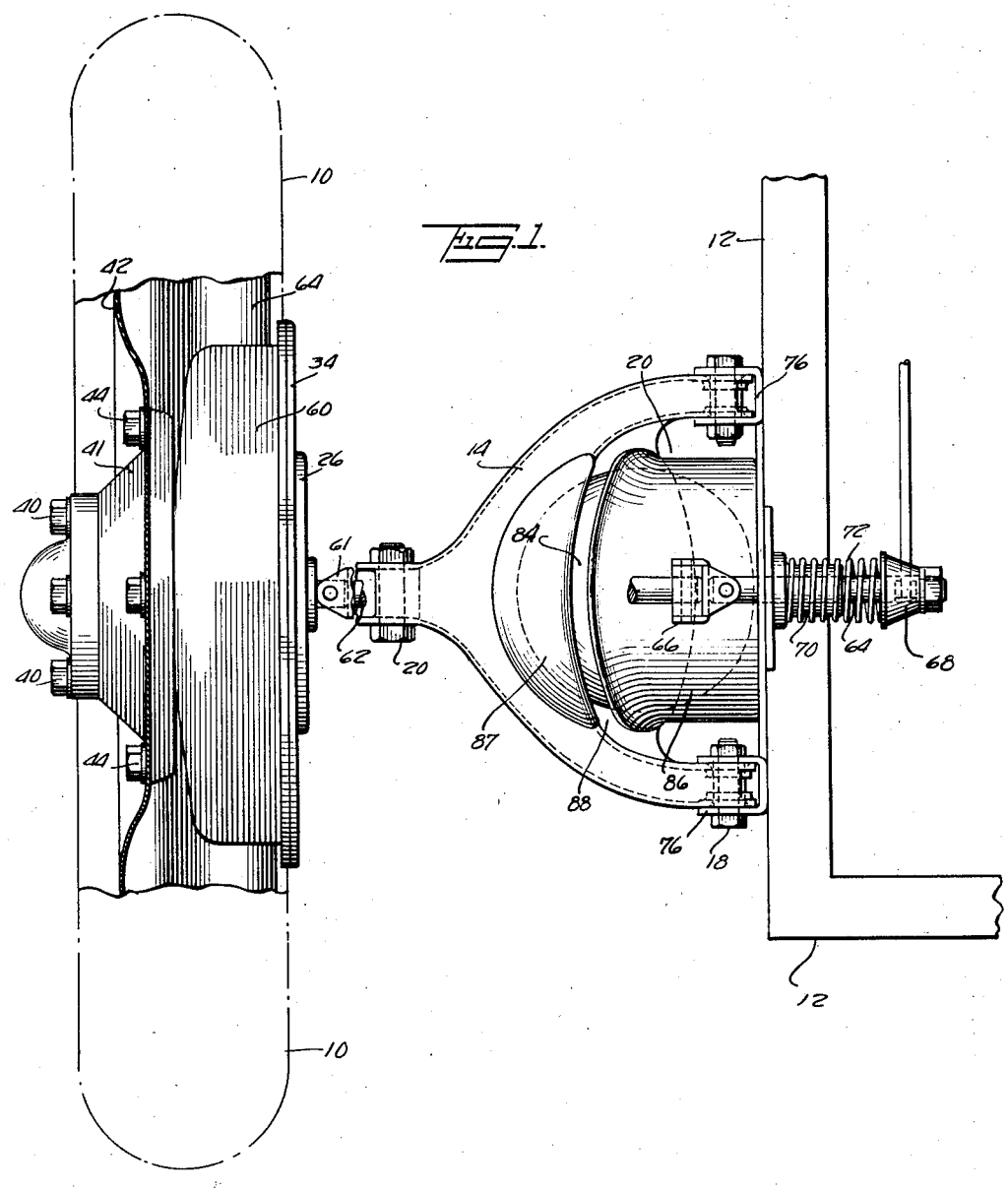
INVENTORS
Miles H. Carpenter
BY Charles B. Kirkham
Dyke, Holden and Schames
ATTORNEYS

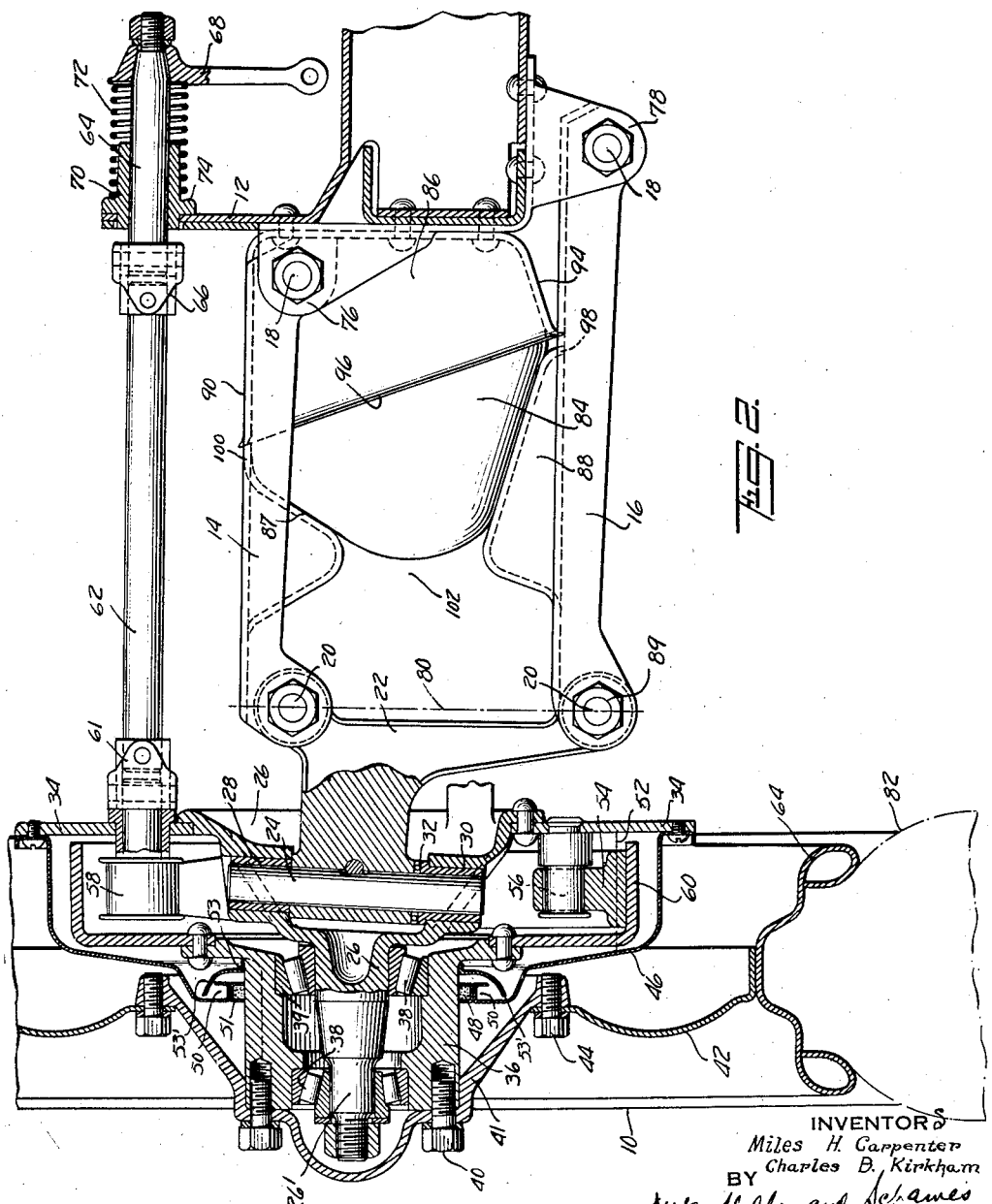

Patented Oct. 11, 1932

1,882,484

UNITED STATES PATENT OFFICE

MILES H. CARPENTER, OF NEW ROCHELLE, AND CHARLES B. KIRKHAM, OF FREEPORT, NEW YORK

INDEPENDENTLY SPRUNG WHEEL CONSTRUCTION FOR THE FRONT END OF MOTOR VEHICLES

Application filed April 6, 1929. Serial No. 353,007.

Our invention is of an independently sprung wheel construction for the front end of motor vehicles.

The object of the invention is to provide a simple, sturdy, reliable and efficient device for this purpose, together with providing for improvement of the front wheel brakes and related parts, and the invention will be best understood from the following description of a preferred form of embodiment.

In the accompanying drawings, we have illustrated an embodiment of the invention for the purpose of affording an understanding thereof. In said drawings—

Fig. 1 is a plan view of a right front wheel and its mounting with parts broken away; and Fig. 2 is a front view of same, partly in section.

Reference character 10 designates the vehicle wheel, and 12 the frame of an automobile or other motor vehicle. The wheels are independently sprung and there is no axle in the sense of a rigid member extending entirely across the front of the car. Upper and lower link members 14 and 16 extend laterally out from the frame, and each of them is mounted to pivot on a horizontal pivoting axis. These connecting links, viewed in plan, as in Fig. 1, are widest at their inner ends where they are attached to the frame, and narrowest at their outer ends next to the wheel, and, in this way, the pivotal connections between the link members and the frame, as for example the connections 18, 18 for the upper link 14, can be spaced well apart in order to give the wheels stability in front to back direction in driving. Self-lubricating bushings, as for example so-called compo-bushings, can be used to good advantage in these bearings. Link members 14 and 16 are preferably of sheet metal stampings which are light, strong and inexpensive and are desirably used wherever practicable.

The outer ends of the preferably parallel links 14 and 16 are pivotally connected at 20, 20 to the upper and lower ends of a yoke member 22 having secured thereto the steering pivot pin 24.

The steering wheel spindle member 26 is arranged to turn upon bearings 28, 30, 32, on the pivot pin 24 and has secured thereto the annular brake carrier plate 34.

The wheel hubs 36 rotating on antifriction bearings 38 and 39 on the spindle 26' have secured on their outer ends by bolts 40 the combined hub cap and wheel driving flange 40, to which the wheel disk 42 is detachably secured by bolts 44. This arrangement, by which the wheel disk and tire are supported from the outer end of the hub, leaves room for the sheet metal brake drum cover plate 46 which is secured to the brake carrier plate 34 by a gasketed oil-tight connection.

In order to provide a simple and convenient form of construction for receiving the felt washer 48 for excluding water from and retaining oil within the receptacle formed by the members 34 and 46, a separate grooved ring 51 is forced within the opening left in cover plate 46 after groove 50 has been spun or otherwise formed about said opening, and the grooved ring 51 is permanently secured in place, as by means of spot welding. A sheet metal ring 53, having an outwardly extending flange 53' and pressed tightly in place on the hub 36 so as to turn therewith, serves when rotating as an oil slinger and when the parts are at rest as a deflector to direct dropping oil back into the oil at the bottom of the casing.

The chamber so formed between the brake carrier plate 34 and the sheet metal cover 46 can contain oil up to, say, a normal level as indicated at 52, and this oil serves to lubricate the enclosed parts including the steering pivot pin 24 and the preferably metallic brake shoes 54, which are supported on their supporting plate 34 as by pivot pin 56, and are operated by the cam 58 to make braking engagement with the brake drum 60 secured to and rotating with the wheel hub 36. The brakes, being fully enclosed and working in oil, are completely weatherproof and always uniform in their braking action. The heat due to braking is communicated to the oil and rapidly dissipated by the thin cover 46 and other exposed parts.

The brake carrier plate 34 is located toward the chassis frame 12 beyond the pivot pin 24 and thus the universal joint 61 connecting the brake operating shaft 62 to the brake cam 58 moves with said plate 34 through an arc as the spindle member 26 is turned in steering, thereby moving the shaft 62 axially or longitudinally. To permit such longitudinal movement of shaft 62, a brake lever extension shaft 64, connected to shaft 62 by the universal joint 66 and having brake lever 68 attached to it, slides in a bearing 70 in the frame, the spring 72 being interposed between a shoulder 74 on the bearing member 70 and the brake lever 68. This keeps the parts snug and prevents rattling while at the same time permitting the necessary slight lengthwise movement of the brake shaft parts.

With support by parallel linkage comprising upper and lower links both of the same length, depression of the car with respect to the wheel will produce material bodily inward translatory movement of the wheel toward the frame. We avoid such effect by making the upper links 14 pivotally connected at 18 to brackets 76 on the outer sides of the frame shorter than the lower links 16, as by pivotally connecting the inner ends of the relatively longer links 16 to the under brackets 78 of the frame 12 and also by making the line 80, joining the outer link pivots 20, 20, parallel to the pivot pin 24, which pin 24 is inclined out at the bottom to bring its axis prolonged to substantially the center of the region of the point of contact of tire 82 with the ground. In this way the top of the wheel has a greater in and out movement than the bottom of the wheel, and practically all in and out movement of the wheel to and away from the frame taking place upon up and down movement of the frame relative to the wheel is confined to that part of the wheel farthest from the ground.

While the springing of the independently mounted front wheels can be obtained by steel springs suitably connected to the parts, we preferably make use of rubber under compression, as by inserting a preferably solid originally spherical rubber ball 84 so that substantially half of the ball is received within the recess in the cup member 86 fastened in the frame 12 between the diverging inner ends of the link member as 14, and with the part of said rubber member 84 that projects from such cup member 86 embraced between the hollowed out upper and lower cheek portion 87 and 88 of the respective link members 14 and 16.

To insert the rubber ball or block 84 under a sufficient initial compression, the pivot connection at 20 can be temporarily disconnected and link 18 lowered, and the parts connected after the insertion of the rubber block upon jacking up the link 16.

Inasmuch as the greatest strains of springing, including support of the body and load, are concentrated between the upper part 90 of cup member 86 and the lower link cheek portion 88, these parts are extended farthest and the recoil resistance parts 87 and 94 extend a relatively less distance. In this way, the outer face or rim 96 of the cup member 86 carried on the frame is preferably inclined outwardly at its top and inwardly toward the frame at its lower part, as shown in Fig. 2. The lips 98 and 100 of the cheek portions 87 and 88 are so constructed that they can pass the lips of the cup member 86. Room for extension of the rubber 84 when compressed is provided as between cheek portions 87 and 88 in the region marked 102, and into suitable open spaces in cup 86, etc. The entire wheel suspension, including links 14 and 16 can readily be enclosed in a suitable flexible cover of fabric, sheet metal or other material to protect the rubber or equivalent springing device and to exclude mud and water.

Apparatus in accordance with our invention comprises numerous features of advantage. The wheels being independently sprung, shocks imparted to one are not transmitted to the other, the brake working parts are wholly enclosed and same and related parts oiled by splash oiling within the enclosure, giving long life and uniform operation over long periods; the springing medium is inexpensive and yet efficient, the parts are not likely to be clogged or hindered in their action by mud or ice, the unsprung weight reduced to the minimum, the center of gravity is kept low, in and out movement of the tire tread parts toward and away from the frame is avoided, and various other features of advantage secured.

It is to be understood that changes coming within the following claims are comprised within our invention.

We claim:

1. Independent front wheel construction for motor vehicles comprising a body portion, substantially parallel links connecting the wheel to the body portion and having abutment portions thereon, a retaining member attached to the body portion between said links, and a rubber member interposed between said abutment portions and said retaining member.

2. In a motor vehicle, a body portion, a front wheel, a spindle therefor, upper and lower links extending laterally at substantially a right angle to the body portion and pivoted thereto and to the spindle respectively, the pivotal connections to the body portion being elongated to give front to back rigidity to the wheel, the lower of said links being longer than the upper thereof, a mass of rubber, and means in part on said body portion and in part on said links for receiving said mass of rubber and retaining the same in place.

3. In a motor vehicle, a body portion, a wheel, a spindle therefor, parallel links from the spindle to the body portion, a cup on the body portion between the links, means on said links cooperating with said cup to form an enclosure, and a rubber ball partly in the cup and partly extending therefrom into engagement with the said last named means, said cup having room to accommodate displaced rubber.

4. In a motor vehicle, a frame, a wheel, a spindle therefor, a member on which the spindle is pivotally mounted for steering movement, an upper link pivoted at its outer end to said member and pivoted at its inner end to the frame by a relatively elongated pivot connection, a lower link similarly pivotally connected to the said member and the frame, a cup member on the frame between the elongated pivotal connections of the links thereto and said cup opening outwardly toward the wheel, a mass of rubber adapted to act as a compression cushioning member and located partly in the cup and partly projecting out of the open end of the cup, said projecting part being interposed between parts of the upper and lower links respectively, the rubber serving for coacting with said links to resiliently control the up and down movement of the wheel with respect to the vehicle frame.

In testimony whereof we have signed our names hereto.

MILES H. CARPENTER.
CHARLES B. KIRKHAM.